(12) United States Patent
Makino

(10) Patent No.: US 8,506,438 B2
(45) Date of Patent: Aug. 13, 2013

(54) CYCLOIDAL SPEED REDUCER, IN-WHEEL MOTOR DRIVE DEVICE, AND VEHICLE MOTOR DRIVE DEVICE

(75) Inventor: Tomoaki Makino, Iwata (JP)

(73) Assignee: NTN Corporation, Osaka (JP)

( * ) Notice: Subject to any disclaimer, the term of this patent is extended or adjusted under 35 U.S.C. 154(b) by 246 days.

(21) Appl. No.: 12/996,686

(22) PCT Filed: Jun. 10, 2009

(86) PCT No.: PCT/JP2009/060582
§ 371 (c)(1),
(2), (4) Date: Dec. 7, 2010

(87) PCT Pub. No.: WO2010/001698
PCT Pub. Date: Jan. 7, 2010

(65) Prior Publication Data
US 2011/0082000 A1    Apr. 7, 2011

(30) Foreign Application Priority Data
Jul. 2, 2008 (JP) .................................. 2008-173902
Apr. 14, 2009 (JP) .................................. 2009-098344

(51) Int. Cl.
*F16H 57/04* (2010.01)
*F16H 1/32* (2006.01)

(52) U.S. Cl.
USPC .......................................... 475/159; 475/179

(58) Field of Classification Search
USPC ........................................... 475/178, 179, 168
See application file for complete search history.

(56) References Cited

U.S. PATENT DOCUMENTS 5,286,237 A * 2/1994 Minegishi ..................... 475/178
5,738,183 A * 4/1998 Nakajima et al. ............. 180/444

FOREIGN PATENT DOCUMENTS

| JP | 5-162542 | 6/1993 |
|---|---|---|
| JP | 2004-108452 | 4/2004 |
| JP | 2006-064128 | 3/2006 |
| JP | 2006-226499 | 8/2006 |
| JP | 2006-258289 | 9/2006 |
| JP | 2006-336702 | 12/2006 |
| JP | 2007-218407 | 8/2007 |
| JP | 2007-292248 | 11/2007 |
| WO | 2007/097085 | 8/2007 |
| WO | 2007/097086 | 8/2007 |

OTHER PUBLICATIONS

Machine translation of applicant supplied prior art Minegushi JP 2006336702.*

* cited by examiner

*Primary Examiner* — David D Le
*Assistant Examiner* — Mark Manley
(74) *Attorney, Agent, or Firm* — Clark & Brody

(57) ABSTRACT

A speed reducer part includes a casing, an input shaft arranged in the casing, eccentric members eccentric with respect to an axis of the input shaft and coupled to an end of the input shaft, revolution members supported by outer circumferences of the eccentric members through a rolling bearing, to make a revolution motion around the axis together with a rotation of the input shaft, an outer circumference engagement member engaging with outer circumferential parts of the revolution members to cause the revolution members to make a rotation motion, and an output shaft engaging the revolution members to extract the rotation motion. A bearing lubricant oil hole supplies oil to a surface in rolling contact with a rolling body. The lubricant oil hole is arranged in a non-load range, where a load applied from the output shaft and the outer circumference engagement member to the revolution members is not shared.

10 Claims, 8 Drawing Sheets

CYCLOIDAL SPEED REDUCER, IN-WHEEL MOTOR DRIVE DEVICE, AND VEHICLE MOTOR DRIVE DEVICE

TECHNICAL FIELD

The present invention relates to a support structure of a revolution member of a cycloidal speed reducer.

BACKGROUND ART

A conventional in-wheel motor drive device has been disclosed in Japanese Unexamined Patent Publication No. 2006-258289 (patent document 1). According to the in-wheel motor drive device disclosed in the patent document 1, a drive motor, a speed reducer to receive driving force from the drive motor and reduce rotation speed thereof and output it to the wheel side, and a wheel hub member coupled to an output shaft of the speed reducer are coaxially arranged. This speed reducer has a cycloidal speed reducing mechanism, so that a high speed reduction ratio is obtained as compared with a planetary gear type of speed reducing mechanism which is common as a conventional speed reducer. Therefore, this is considerably advantageous in that torque required for the drive motor can be small, and the in-wheel motor drive device can be reduced in size and weight. In addition, according to this cycloidal speed reducing mechanism, an outer pin is rotatably supported by a needle roller bearing with respect to a casing. Therefore, this is considerably advantageous in that contact resistance between a curve plate and the outer pin can be greatly reduced, and a torque loss of the speed reducer can be cut.

According to the cycloidal speed reducing mechanism in the patent document 1, as shown in FIG. 3, a disk-shaped eccentric part 25a is mounted on an input shaft of the speed reducer which is coupled to a rotation shaft of the drive motor so as to be eccentric with respect to an axis O of the input shaft. More specifically, an axial center O2 of the eccentric part 25a is eccentric with respect to the axis O of the input shaft by an eccentric amount of "e". A curve plate 26a is mounted on an outer circumference of the eccentric part 25a with a rolling bearing 41 therebetween, and the eccentric part 25a rotatably supports the curve plate 26a. The axial center O2 serves also as an axial center of the curve plate 26a. An outer circumference of the curve plate 26a is composed of a waveform curve and has radially recessed waveform parts 33 provided at circumferentially regular intervals. The curve plate 26a is surrounded by a plurality of outer pins 27 which engage with the recessed parts 33 and are circumferentially arranged around the axis O.

In FIG. 3, as the eccentric part 25a rotates anticlockwise on the sheet surface together with the input shaft, the eccentric part 25a make a revolution motion around the axis O, so that the recessed parts 33 of the curve plate sequentially abut on the outer pins 27 in a circumferential direction. As a result, as shown by arrows, the curve plate 26a receives a load Fi from the plurality of outer pins 27 and rotates clockwise.

In addition, a plurality of through holes 30a are circumferentially arranged around the axial center O2 in the curve plate 26a. An inner pin 31 coupled to the output shaft of the speed reducer arranged coaxially with the axis O passes through each through hole 30a. Since an inner diameter of the through hole 30a is sufficiently larger than an outer diameter of the inner pin 31, the inner pin 31 does not disturb the revolution motion of the curve plate 26a. Thus, the inner pin 31 extracts the revolution motion of the curve plate 26a and rotates the output shaft. At this time, the output shaft has higher torque and lower rotation speed than the input shaft, so that the curve plate 26a receives a load Fj from the plurality of inner pins 31 as shown by arrows in FIG. 3. The loads Fi and Fj are combined and a bearing load Fs is provided.

According to the cycloidal speed reducing mechanism, since a rotation difference is large between the input shaft and the output shaft, and driving force of the vehicle is transmitted, the bearing load Fs is high, so that it is necessary to appropriately lubricate the rolling bearing 41 in order to implement a stable operation without causing a burn. More specifically, a lubricant oil hole to supply a lubricant oil is provided in the rolling bearing 41 which includes a rolling body, an outer ring member provided on the outer diameter side with respect to the rolling body, and an inner ring member provided on the inner diameter side with respect to the rolling body. It is conceivable that the lubricant oil hole is arranged in an outer circumference track surface of the inner ring member 42 or an inner circumference track surface of the outer ring member with which the rolling body is in rolling contact.

In the case where the lubricant oil is supplied from the radial outer side to the inner circumference track surface of the rolling bearing 41, the lubricant oil could be splashed due to high rotation speed, or outflow toward the radial outer side due to centrifugal force, so that it is difficult to distribute the lubricant oil in the whole rolling bearing. Thus, the lubricant oil is preferably supplied from the radial inner side to the outer circumference track surface of the rolling bearing 41. More specifically, the radially extending lubricant oil hole is arranged in the eccentric part 25a, and a radial outer side end of the lubricant oil hole is arranged in the outer circumference track surface of the inner ring member 42. Thus, the lubricant oil is supplied from the inside of the input shaft to the rolling bearing 41 through the lubricant oil hole of the eccentric part 25a.

BACKGROUND ART DOCUMENT

Patent Document

Patent Document 1 Japanese Unexamined Patent Publication No. 2006-258289

SUMMARY OF THE INVENTION

Problems to be Solved by the Invention

However, according to the method to supply the lubricant oil from the radial inner side to the rolling bearing 41 as described above, since the lubricant oil hole is provided in the outer circumference track surface, a contact area between the rolling body and the outer circumference track surface is reduced, and a contact surface pressure therebetween increases. As a result, a rolling fatigue life could be shortened. In addition, since a high stress is generated in the vicinity of the radial outer side end of the lubricant oil hole, a crack could be generated and spread from the oil hole end.

It is an object of the present invention to provide a in-wheel motor drive device capable of supplying a lubricant oil to a rolling bearing without increasing a contact surface pressure of the rolling bearing.

Means for Solving Problems

A cycloidal speed reducer according to the present invention to achieve the above object includes a casing; an input shaft having one end arranged in the casing; a disk-shaped eccentric member eccentric with respect to an axis of the input shaft and coupled to the one end of the input shaft; a revolution member supported by the eccentric member, to make a revolution motion around the axis together with a rotation of the input shaft; a rolling bearing arranged between an inner circumference of the revolution member and an outer circumference of the eccentric member; an outer circumference engagement member supported by the casing and engaging with an outer circumference part of the revolution member to cause the revolution member to make a rotation motion; and an output shaft engaging with the revolution member to extract the rotation motion. Thus, the rolling bearing has a rolling body, an inner ring member mounted on the outer circumference of the eccentric member, and a lubricant oil hole penetrating from an inner diameter surface of the inner ring member to an outer circumference track surface thereof to supply a lubricant oil to the outer circumference track surface of the inner ring member being in rolling contact with the rolling body, and the lubricant oil hole is arranged in a non-load range in which a bearing load is not applied from the output shaft and the outer circumference engagement member to the revolution member, in the outer circumference track surface of the rolling bearing.

According to the present invention, since the lubricant oil hole is connected to the portion which does not share the bearing load in the outer circumference track surface, the contact surface pressure does not increase. Therefore, a crack is prevented from being generated and spread from a radial outer side end of the lubricant oil hole, and a rolling fatigue life of the rolling bearing can increase.

The present invention is not limited to the one embodiment, and the lubricant oil hole is arranged in a range from 90 degrees to 270 degrees circumferentially away from a portion receiving a highest bearing load to be shared, in the outer circumference track surface. Thus, a crack is prevented from being generated and spread from the radial outer side end of the lubricant oil hole, and the rolling fatigue life of the rolling bearing can increase.

Preferably, the lubricant oil holes are arranged in at least a portion at 180 degrees circumferentially away from the portion receiving the highest bearing load to be shared, and portions at a predetermined angle away from the portion at 180 degrees in one circumferential direction and in the other circumferential direction, in the outer circumference track surface, and the predetermined angle is 90 degrees or less. Thus, the lubricant oil can be easily supplied to the whole circumferential region.

The present invention is not limited to the one embodiment, and the lubricant oil hole is arranged in a region containing a portion closest to the axis as its center and ranging from a portion at 45 degrees therefrom in one circumferential direction to a portion at 45 degrees therefrom in the other circumferential direction, in the outer circumference track surface.

Preferably, the lubricant oil holes are arranged in at least a portion closest to the axis and portions at a predetermined angle from the portion closest to the axis in one circumferential direction and in the other circumferential direction, and the predetermined angle is 45 degrees or less. Thus, the lubricant oil can be easily supplied to the whole circumferential region.

Preferably, the rolling bearing is a cylindrical roller bearing comprising a flange part projecting from axial both ends of the outer circumference track surface toward the radial outer side. Thus, the contact surface pressure can be small, and the lubricant oil can be held between the flange parts at both ends.

In addition, an in-wheel motor drive device according to the present invention includes the cycloidal speed reducer according to the present invention, a motor part to rotate and drive an input shaft of the cycloidal speed reducer, and a wheel hub fixedly connected to an output shaft of the cycloidal speed reducer. Thus, the rolling fatigue life increases, so that the life of the in-wheel motor drive device can increase.

In addition, a vehicle motor drive device according to the present invention includes the cycloidal speed reducer according to the present invention, and a motor part to rotate and drive an input shaft of the cycloidal speed reducer, and is mounted on a car body of a vehicle. Thus, the rolling fatigue life increases, the life of the car body mount type of vehicle motor drive device can increase.

The vehicle motor drive device according to the present invention is not limited to the first embodiment, and the vehicle motor drive device includes one the motor part and one the cycloidal speed reducer, and further includes a differential gear device connected to an output shaft of the cycloidal speed reducer. According to the above embodiment, a long life can be implemented in the vehicle motor drive device to distribute motor torque to the right and left wheels, or the front and rear wheels.

Effect of the Invention

Thus, the lubricant oil hole of the in-wheel motor drive device according to the present invention is arranged in the non-load range where the bearing load applied from the output shaft and the outer circumference engagement member to the revolution member is not shared, in the outer circumference track surface of the rolling bearing. Thus, the contact surface pressure does not increase in the outer circumference track surface in the vicinity of the lubricant oil hole. Therefore, the crack is prevented from being generated and spread in the outer circumference track surface from the radial outer side end of the lubricant oil hole, so that the rolling fatigue life of the rolling bearing can increase.

DESCRIPTION OF THE PREFERRED EMBODIMENTS

Figure 1:
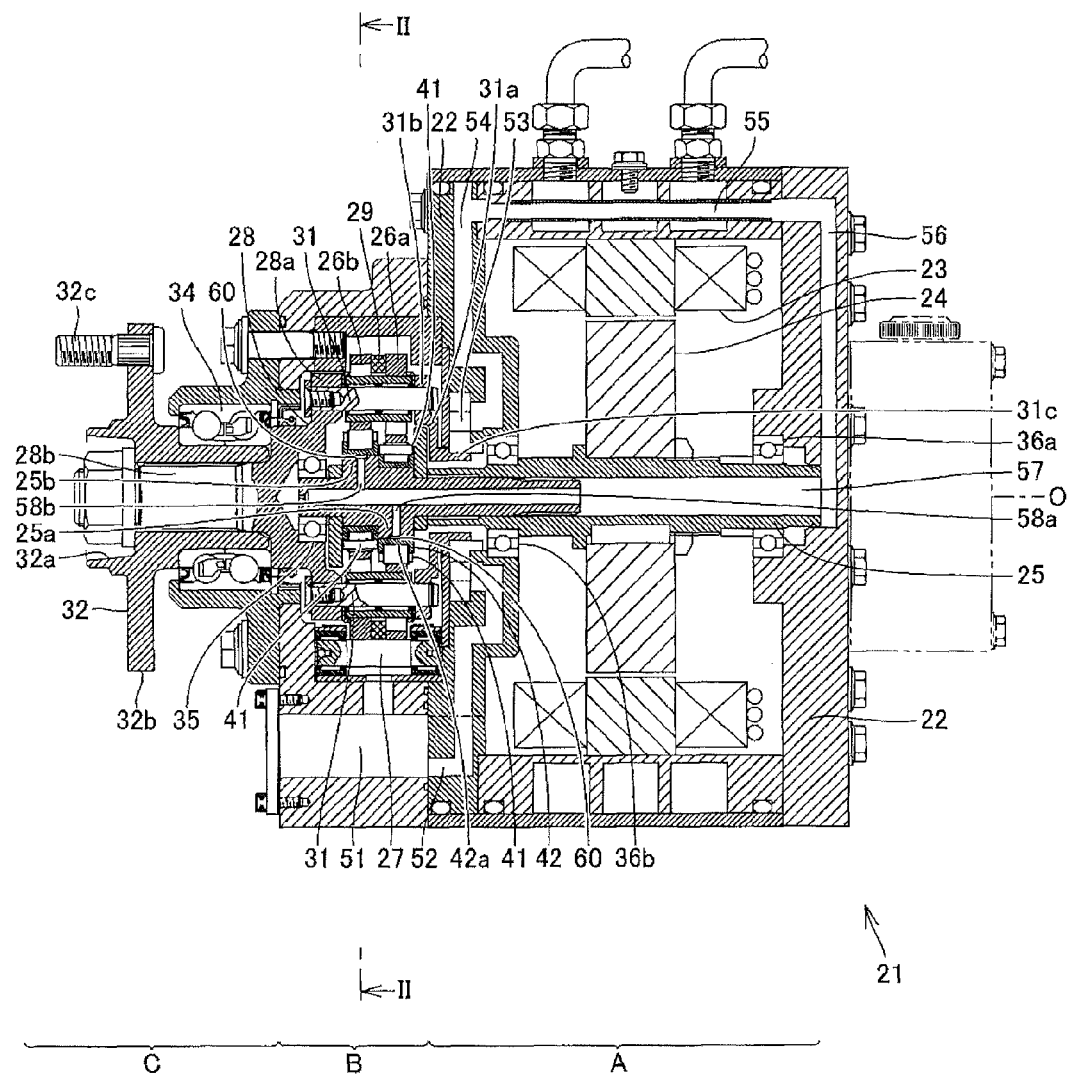
FIG. 1 is a vertical cross-sectional view showing an in-wheel motor drive device including a cycloidal speed reducer in this working example.
Figure 2:
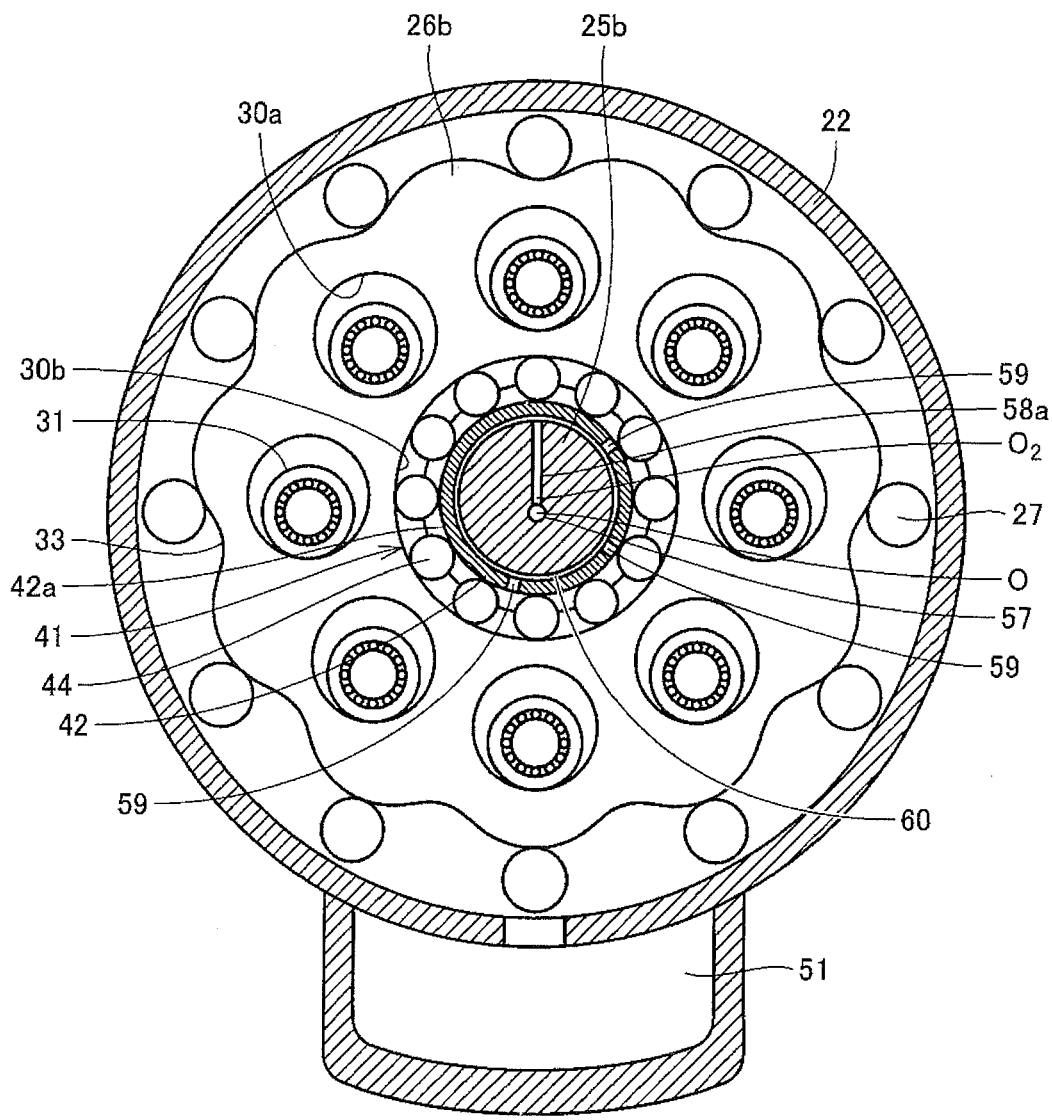
FIG. 2 is a lateral cross-sectional view taken along a line II-II in FIG. 1

Hereinafter, a detailed description will be made of an embodiment of the present invention based on a working example shown in the drawings. FIG. 1 is a vertical cross-sectional view showing an in-wheel motor drive device provided with a cycloidal speed reducer according to a first working example of the present invention. FIG. 2 is a lateral cross-sectional view taken along a line II-II in FIG. 1.

An in-wheel motor drive device 21 as one example of a vehicle speed reducer part includes a motor part A to generate driving force, a speed reducer part B to reduce rotation speed of the motor part A and output it, a wheel hub bearing part C to transmit an output from the speed reducer part B to a drive wheel (not shown). The motor part A and the speed reducer part B are housed in a casing 22, and mounted in a wheel housing of an electric car, for example. Alternatively, they are mounted on a carriage of a railroad vehicle.

The motor part A is a radial gap motor having a stator 23 fixed to the casing 22, a rotor 24 arranged so as to be opposed to an internal side of the stator 23 with a radial gap therebetween, and a motor-side rotation member 25 fixedly connected to an internal side of the rotor 24 and rotating integrally with the rotor 24.

The motor-side rotation member 25 is arranged so as to extend from the motor part A to the speed reducer part B to transmit the driving force of the motor part A to the speed reducer B, and corresponds to an input shaft of the speed reducer part B. Thus, its one end arranged in the speed reducer part B is coupled to eccentric members 25a and 25b. The end of the motor-side rotation member 25 provided on the side of the eccentric members 25a and 25b is rotatably supported by a rolling bearing 35. In addition, the motor-side rotation member 25 is fitted to the rotor 24 and supported by rolling bearings 36a and 36b at both ends of the motor part A. Furthermore, the two disk-shaped eccentric members 25a and 25b are arranged such that their phases are shifted by 180° so as to offset vibrations generated due to centrifugal force caused by an eccentric motion.

The speed reducer part B includes curve plates 26a and 26b serving as revolution members rotatably held by the eccentric members 25a and 25b, a plurality of outer pins 27 serving as outer circumference engagement members which engage with outer circumference parts of the curve plates 26a and 26b, a motion converting mechanism to transmit rotation motion of the curve plates 26a and 26b to a wheel-side rotation member 28, a support member (referred to as the center collar also) 29 mounted on a space between the curve plates 26a and 26b to prevent the curve plates from being inclined by abutting on the curve plates 26a and 26b, and an oil pool 51 to receive an lubricant oil in the speed reducer part B. The curve plate 26a is rotatably supported by a rolling bearing 41 with respect to the eccentric member 25a. In addition, the curve plate 26b is also rotatably supported by another rolling bearing 41 with respect to the eccentric member 25b.

The motion converting mechanism of the speed reducer part B is composed of a plurality of inner pins 31 held by the wheel-side rotation member 28, and through holes 30a provided in the curve plates 26a and 26b. The inner pins 31 are provided at regular intervals on a circumferential track around a rotation axis O of the wheel-side rotation member 28, and their axial one side ends are fixed to the wheel-side rotation member 28. In addition, the inner pin 31 is provided with a needle roller bearing at a position where it abuts on a wall surface of the through hole 30a of the curve plates 26a and 26b in order to reduce frictional resistance against the curve plates 26a and 26b. Meanwhile, the through hole 30a is provided at a position corresponding to each of the inner pins 31, and an inner diameter dimension of the through hole 30a is set so as to be larger than an outer diameter dimension (a maximum outer diameter including the needle roller bearing, which is applied to the following description) of the pin 31 by a predetermined amount.

The wheel hub bearing part C includes a wheel hub 32 fixedly connected to the wheel-side rotation member 28, and a wheel hub bearing 34 to rotatably support the wheel hub 32 with respect to the casing 22. The wheel hub bearing 34 is a double-row angular ball bearing, and its inner ring is fitted and fixed to an outer diameter surface of the wheel hub 32. The wheel hub 32 has a cylindrical hollow part 32a and a flange part 32b. A drive wheel (not shown) is fixedly connected to the flange part 32b by a bolt 32c.

A detailed description will be made of an operation principle of the above in-wheel motor drive device 21.

The motor part A receives electromagnetic force generated when an AC current is applied to a coil of the stator 23, for example, thereby rotating the rotor 24 composed of a permanent magnet or magnetic body.

Thus, as the motor-side rotation member 25 rotates with the rotor 24, the curve plates 26a and 26b make the revolution motion around the rotation axis O of the motor-side rotation member 25. At this time, the outer pins 27 engage with curved waveforms of the curve plates 26a and 26b so as to be in rolling contact with them so that the curve plates 26a and 26b make the rotation motion in an opposite direction of the rotation of the motor-side rotation member 25.

The inner pin 31 passing through the through hole 30a is sufficiently smaller than the inner diameter of the through hole 30a, and abuts on the wall surface of the through hole 30a along with the rotation motion of the curve plates 26a and 26b. Thus, the revolution motion of the curve plates 26a and 26b is not transmitted to the inner pins 31, and only the rotation motion of the curve plates 26a and 26b is transmitted to the wheel hub bearing part C through the wheel-side rotation member 28.

At this time, the wheel-side rotation member 28 disposed coaxially with the axis O as an output shaft of the speed reducer part B extracts the rotation motion of the curve plates 26a and 26b B through the motion converting mechanism. As a result, the rotation speed of the motor-side rotation member 25 is reduced by the speed reducer part B and transmitted to the wheel-side rotation member 28. Therefore, even when the motor part A is a low-torque and high-rotation type, torque required for the drive wheel can be transmitted.

In addition, a speed reduction ratio of the above speed reducer part B is calculated by (ZA−ZB)/ZB wherein ZA represents the number of the outer pins 27, and ZB represents the number of waveforms of the curve plates 26a and 26b. According to the embodiment shown in FIG. 2, since ZA=12 and ZB=11, the speed reduction ratio is 1/11, so that the speed reduction ratio is considerably high.

Thus, since the high speed reduction ratio can be provided without needing a multistage configuration in the speed reducer part B, the in-wheel motor drive device 21 can be compact in size and high in speed reduction ratio.

The wheel-side rotation member 28 serves as the output shaft of the speed reducer B, and has a flange part 28a and a shaft part 28b. In an end face of the flange part 28a, holes to fix the inner pins 31 are formed at regular intervals on a circumference around the rotation axis O of the wheel-side rotation member 28. The wheel hub 32 is fixed to an outer diameter surface of the shaft part 28a. The wheel hub 32 is rotatably supported by the wheel hub bearing 34 with respect to the casing 22.

A reinforcement member 31a is provided at an axial end of the inner pin 31. The reinforcement member 31a includes an annular-shaped annular part 31b, and a cylindrical part 31c axially extending from an inner diameter surface of the annular part 31b. Since a load applied from the curve plates 26a and 26b to some of the inner pins 31 can be supported by all the inner pins 31 through the reinforcement member 31a, the stress applied to the inner pin 31 can be reduced and durability can be improved.

The casing 22 positioned between the motor part A and the speed reducer part B is provided with an oil pump 53. The oil pump 53 is driven by the reinforcement member 31a. An inhale oil path 52 provided in the casing 22 connects an inlet of the oil pump 53 and the oil pool 51 provided in a lower part of the speed reducer part B. A discharge oil path 54 provided in the casing 22 has one end connected to an outlet of the oil pump 53, and the other end connected to a cooling oil path 55 intersecting with a cooling device provided in the casing 22. The cooling oil path 55 is connected to a communicating oil path 56 provided in the casing 22 to cool the lubricant oil flowing in the cooling oil path 55. The communicating oil path 56 is connected to an axis oil path 57 provided in the motor-side rotation member 25 along the axis O. The axis oil path 57 is divided in the speed reducer part B into a lubricant oil path 58a extending from the axis O toward the radial outer side in the eccentric member 25a, and a lubricant oil path 58b extending from the axis O toward the radial outer side in the eccentric member 25b. Radial outer side ends of the lubricant oil paths 58a and 58b are connected to an annular groove 60. The annular groove 60 communicates with an outer circumference track surface of the rolling bearing 41 as will be described below.

The oil pump 53 driven by the wheel-side rotation member 28 through the reinforcement member 31a inhales the lubricant oil stored in the oil pool 51 and discharge the lubricant oil to the discharge oil path 54. The lubricant oil sequentially passes through the discharge oil path 54 and the cooling oil path 55 to be cooled down. Then, the lubricant oil sequentially passes through the communicating oil path 56 and the axis oil path 57, and divided into the lubricant oil paths 58a and 58b, to lubricate the rolling bearing 41 provided for the eccentric member 25a and the rolling bearing 41 provided for the eccentric member 25b, respectively. Thus, the lubricant oil lubricates the members provided in the speed reducer part B and collected in the oil pool 51 provided in the lower part of the speed reducer part B.

Referring to FIG. 2, the curve plate 26b has a plurality of waveforms composed of a trochoid curve such as epitrochoid around its circumferential part, and has the plurality of through holes 30a and 30b penetrating from one side end face to the other side end face thereof. The through holes 30a are provided at regular intervals around a revolution axis O2 of the curve plate 26b, and receive the inner pins 31 which will be described below. In addition, the through hole 30b is provided in the center of the curve plate 26b, and corresponds to an inner circumference of the curve plate 26b. The curve plate 26b is mounted on the outer circumference of the eccentric member 25b so as to be relatively rotatable with it.

The curve plate 26b is rotatably supported by the rolling bearing 41 with respect to the eccentric member 25b. The rolling bearing 41 is a cylindrical roller bearing which includes an inner ring member 42 having an inner diameter surface mounted on an outer diameter surface of the eccentric member 25b, and an outer diameter surface serving as an outer circumference track surface 42a, a plurality of rollers 44 arranged between the outer circumference track surface 42a and a wall (inner circumference track surface) of the through hole 30b, and a retainer (not shown) to retain intervals of the circumferentially adjacent rollers 44. Alternatively, it may be a deep groove ball bearing. The curve plate 26a is provided similarly.

The outer pins 27 are provided at regular intervals on the circumference track around the rotation axis O of the motor-side rotation member 25. Thus, as the curve plates 26a and 26b make the revolution motion, the waveforms of the outer circumference curve shape engage with the outer pins 27 to cause the curve plates 26a and 26b to make the rotation motion. A lubricant oil hole is arranged in the outer circumference track surface 42a. According to this working example, a radial outer side end of the lubricant oil path 58a is connected to three lubricant oil holes 59 through the annular groove 60 which circumferentially extends between the eccentric member 25b (25a) and the inner ring member 42. Thus, the lubricant oil holes 59 are arranged in circumferentially different positions of the outer circumference track surface 42a.

Figure 3:
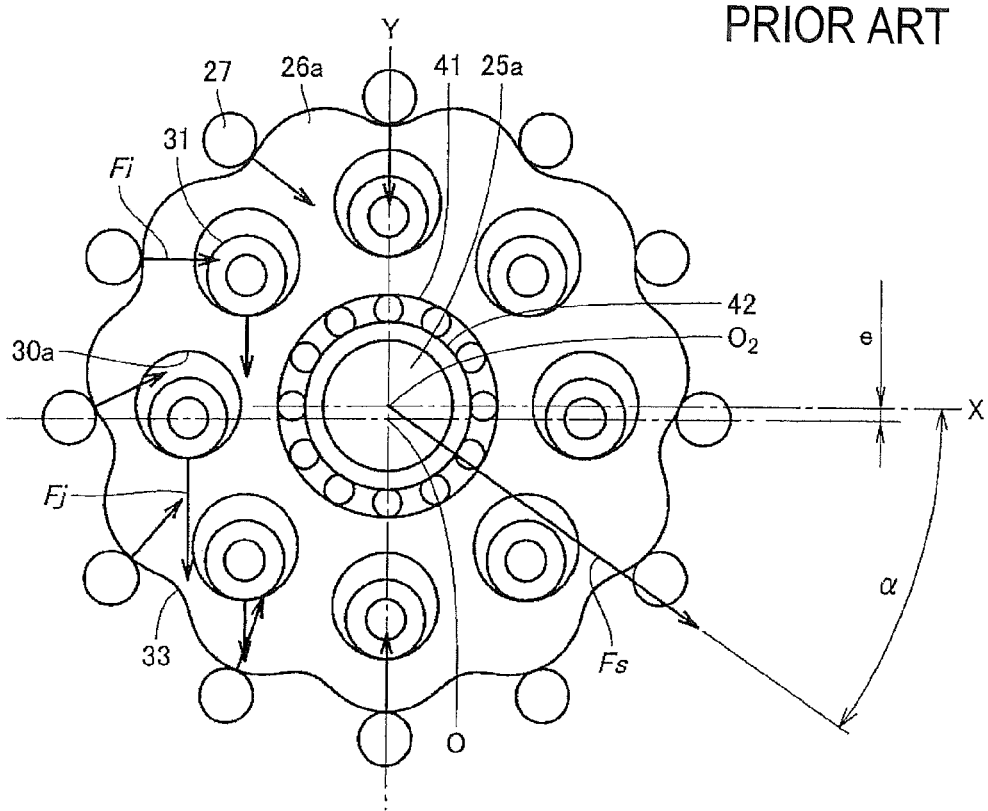
FIG. 3 is an explanatory diagram showing loads applied to a curve plate in FIG. 2 with arrows.

FIG. 3 is an explanatory diagram showing loads applied to the curve plate 26a shown in FIG. 2 by arrows. The curve plate 26a in this working example rotates counterclockwise while revolving counterclockwise on a sheet surface, similar to the above-described conventional example, and receives a load Fi from each of the plurality of outer pins 27, and a load Fj from each of the plurality of inner pins 31 as shown by the arrows, so that the loads Fi and Fj are combined and the load Fs is provided.

A direction of the bearing load Fs varies depending on a geometric condition such as the waveform shape of the curve plate 26a and the number of recessed parts 33 and an influence of centrifugal force. More specifically, an angle $\alpha$ formed between a reference line X which is perpendicular to a line connecting the rotation axial center O2 and the axis O and passes through the axis O, and the bearing load Fs is about 30 to 60 degrees. A representative value of the angle $\alpha$ is preferably a medium value of 45 degrees.

Figure 4:
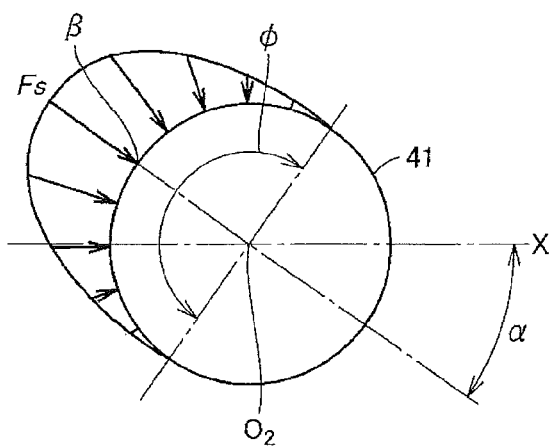
FIG. 4 is an explanatory diagram schematically showing a load distribution of a bearing load shared by a rolling bearing in FIG. 3.
Figure 5:
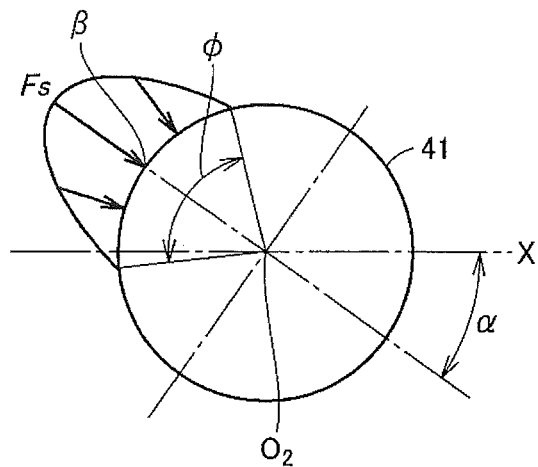
FIG. 5 is an explanatory diagram schematically showing a load distribution of a bearing load shared by a rolling bearing in FIG. 3.

FIGS. 4 and 5 are each explanatory diagrams schematically showing a load distribution of the rolling bearing 41 which shares the bearing load Fs shown in FIG. 3. When a bearing internal gap (radial gap) of the rolling bearing 41 is 0, a load range $\phi$ applied to the rolling bearing 41 is 180 degrees as shown in FIG. 4. When the bearing internal gap (radial gap) is larger than 0, the load range $\phi$ is smaller than 180 degrees as shown in FIG. 5. In addition, when the bearing internal gap (radial gap) is a negative gap which is a little smaller than 0 although not shown in the drawing, the life of the rolling bearing 41 is longest. Furthermore, when the negative gap exceeds this optimal negative gap, the life of the rolling bearing 41 rapidly decreases. Therefore, according to this working example, the bearing internal gap at the time of operation which varies depending on the operational conditions such as a material, a temperature and rotation speed of the eccentric member 25a, the rolling bearing 41 and the curve plate 26a is set to be a positive gap which is a little larger than 0, in the rolling bearing 41.

The shared bearing load is highest at a portion $\beta$ provided in the center of the load range $\phi$. Thus, the shared bearing load decreases with circumferential distance from the portion β. A relationship between the portion β and the direction (angle α) of the bearing load Fs is 180 degrees.

As described with reference to FIGS. 4 and 5, a non-load range (360°−φ) where the bearing load Fs is not shared is 180 degrees or more.

Figure 6:
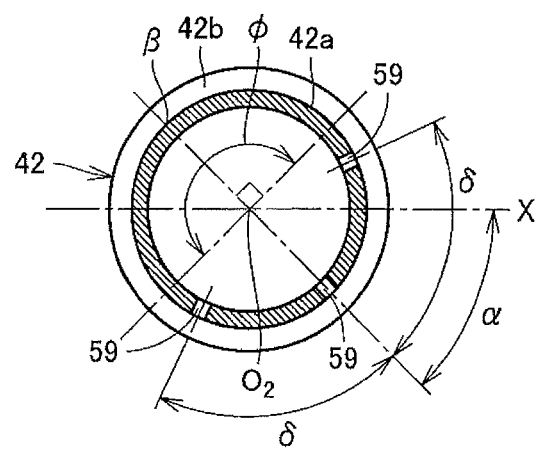
FIG. 6 is a lateral cross-sectional view showing an extracted inner ring member of the rolling bearing in the same working example.
Figure 7:
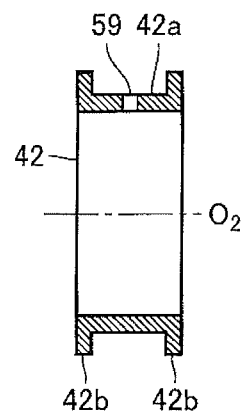
FIG. 7 is a vertical cross-sectional view showing the extracted inner ring member of the rolling bearing in the same working example.

FIG. 6 is a lateral cross-sectional view showing the extracted inner ring member 42 of the rolling bearing 41, and FIG. 7 is a vertical cross-sectional view of the inner ring member 42. The inner circumference of the inner ring member 42 is mounted on the outer circumference of the eccentric member 25a. More specifically, the inner ring member 42 is fixed onto the eccentric member 25a by press fitting and the like. The outer circumference track surface 42a is formed on the outer circumference of the inner ring member 42. The inner ring member 42 is provided with a flange part 42b projecting from axial both ends (in the axial center O2 direction) of the outer circumference track surface 42a toward the radial outer side.

The lubricant oil holes 59 in this working example are arranged in the non-load range where the bearing load Fs is not shared, in the outer circumference track surface 42a. That is, the lubricant oil holes 59 are circumferentially arranged in the outer circumference track surface 42a so as to be positioned in the non-load range from 90 degrees to 270 degrees from the portion β which receives the highest bearing load to be shared. More specifically, the three lubricant oil holes 59 are provided. One is arranged in a portion at 180 degrees circumferentially away from the portion β receiving the highest bearing load to be shared, and this portion is placed at the angle α from the reference line X. Two other ones are arranged in portions at predetermined angle from the above portion at 180 degrees in one and the other circumferential directions, respectively, and this predetermined angle is 90 degrees or less. When the predetermined angle is set to 90 degrees or less, the lubricant oil holes 59 can be arranged in the non-load range (360°−φ).

When the in-wheel motor drive device according to this working example is used as the car drive device, it is most frequently used under the condition of moving-forward direction, so that the rotation direction of the speed reducer can be regarded as only one direction as described with reference to FIG. 3. Therefore, the load range φ is 180 degrees or less, so that the lubricant oil holes 59 are arranged in a range from 90 degrees to 270 degrees circumferentially away from the portion β receiving the highest bearing load to be shared, in the inner ring track surface 42a.

Figure 8:
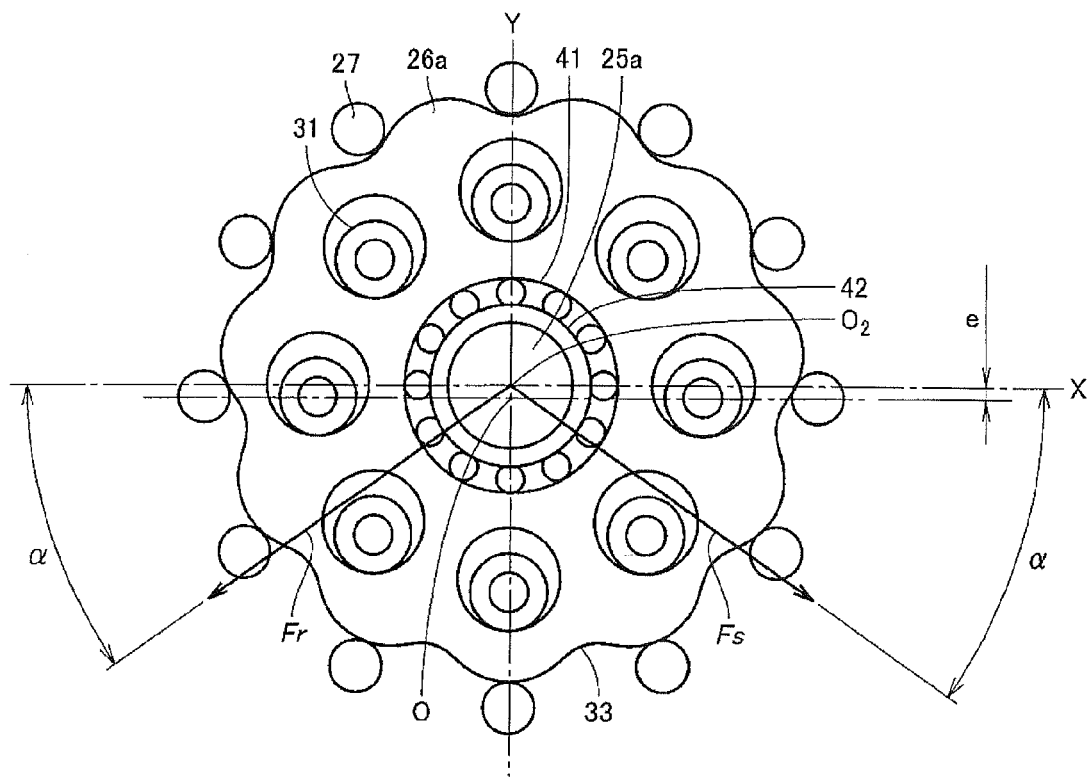
FIG. 8 is an explanatory diagram showing bearing loads applied to the curve plate in FIG. 2 in two different directions.

However, as well as performing the power running operation as the drive device, the in-wheel motor drive device performs a regenerative operation as a regeneration brake in some cases, so that backward running would be performed. Used in these conditions, the rolling bearing 41 receives a bearing load Fr in a different direction as well as the above bearing load Fs, as shown in FIG. 8. The direction of the bearing load Fs and the direction of the bearing load Fr are symmetrical with respect to a reference line Y. In addition, the reference line Y passes through the axis O and the axial center O2 eccentrically shifted from the axis O by "e", and is perpendicular to the reference line X.

Figure 9:
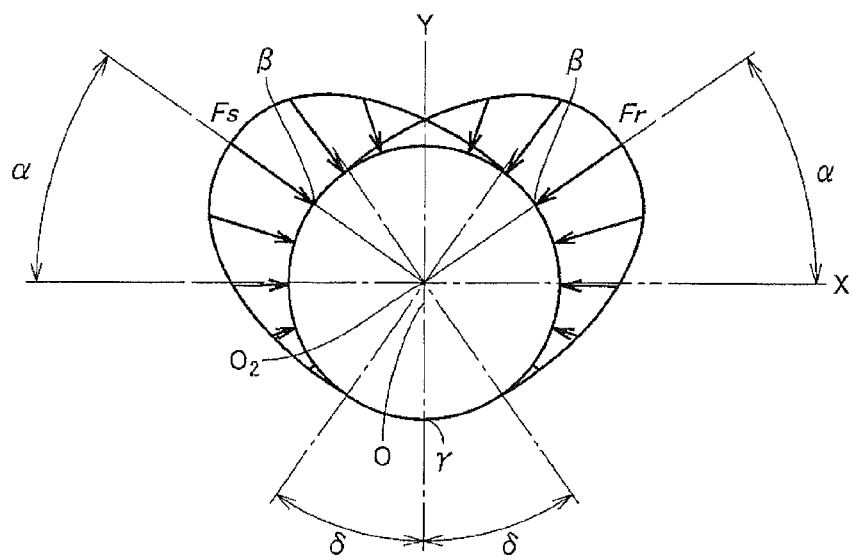
FIG. 9 is an explanatory diagram schematically showing load distributions of the bearing loads shared by the rolling bearing in FIG. 8.

FIG. 9 is an explanatory diagram schematically showing load distributions of the rolling bearing 41 which shares the bearing load Fs and the bearing load Fr shown in FIG. 8. The load ranges applied to the rolling bearing 41 are symmetrical with respect to the reference line Y, and the rest is the non-load range. This non-load range contains a portion γ as a center which intersects with the reference line Y and is closest to the axis O. In addition, when the angles α of the respective bearing load Fs and the bearing load Fr are each 45 degrees and the load range φ thereof are each 180 degrees, the non-load range is provided from the portion at 45 degrees from the portion γ in one circumferential direction to the portion at 45 degrees therefrom in the other circumferential direction.

Thus, the lubricant oil holes 59 according to a variation of the present invention are arranged in the region containing the portion γ which is closest to the axis O as its center, and ranging from the portion at 45 degrees therefrom in one circumferential direction to the portion at 45 degrees therefrom in the other circumferential direction.

Preferably, as shown in FIG. 9, the lubricant oil holes 59 are arranged in at least the portion γ closest to the axis O, and portions at a predetermined angle δ from the portion γ closest to the axis O in one and the other circumferential directions, in the outer circumference track surface 42a, and the predetermined angle δ is 45 degrees or less.

Figure 10:
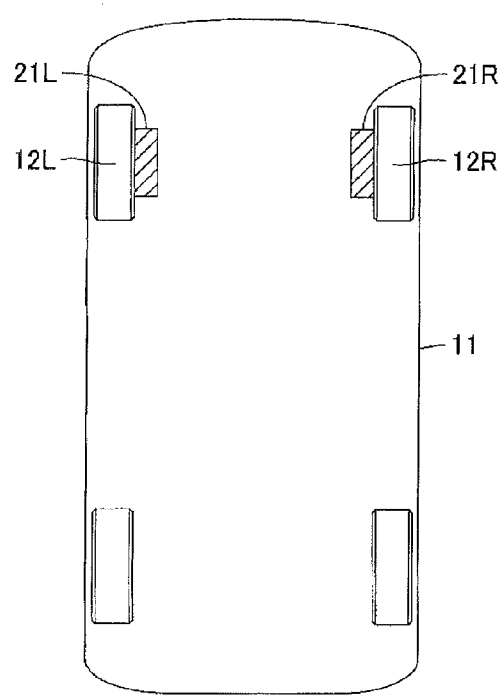
FIG. 10 is a plan view showing an arranged layout of an in-wheel motor drive device including a cycloidal speed reducer in this working example.

FIG. 10 is a plan view showing an arranged layout of the in-wheel motor drive device 21. A car body 11 of the vehicle has four wheels on the front and back sides, and the right and left sides. Among them, a left wheel 12L and a right wheel 12R are drive wheels. The left wheel 12L is connected to the wheel hub 32 of an in-wheel motor drive device 21L arranged on the left side of the vehicle. The in-wheel motor drive device 21L is mounted under a floor of the car body 11 by a suspension device (not shown). Similarly, the right wheel 12R is connected to the wheel hub 32 of an in-wheel motor drive device 21R arranged on the right side of the vehicle. The in-wheel motor drive device 21R is also mounted under the floor of the car body 11 by the suspension device (not shown). Each of the in-wheel motor drive devices 21L and 21R is the above-described in-wheel motor drive device 21, and they are arranged symmetrically with respect to a center line of the car body extending in forward and backward directions of the vehicle.

As described above, as well as being applied to the in-wheel motor drive device 21 directly mounted on the wheel, the speed reducer part B can be applied to the vehicle motor drive device mounted on the car body and connected to the wheel to be driven through a drive shaft.

Figure 11:
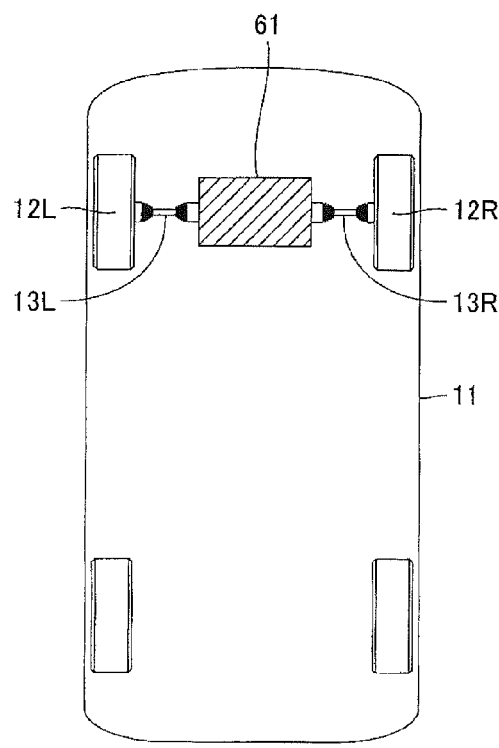
FIG. 11 is a plan view showing an arranged layout of a vehicle motor drive device including the cycloidal speed reducer in this working example.
Figure 12:
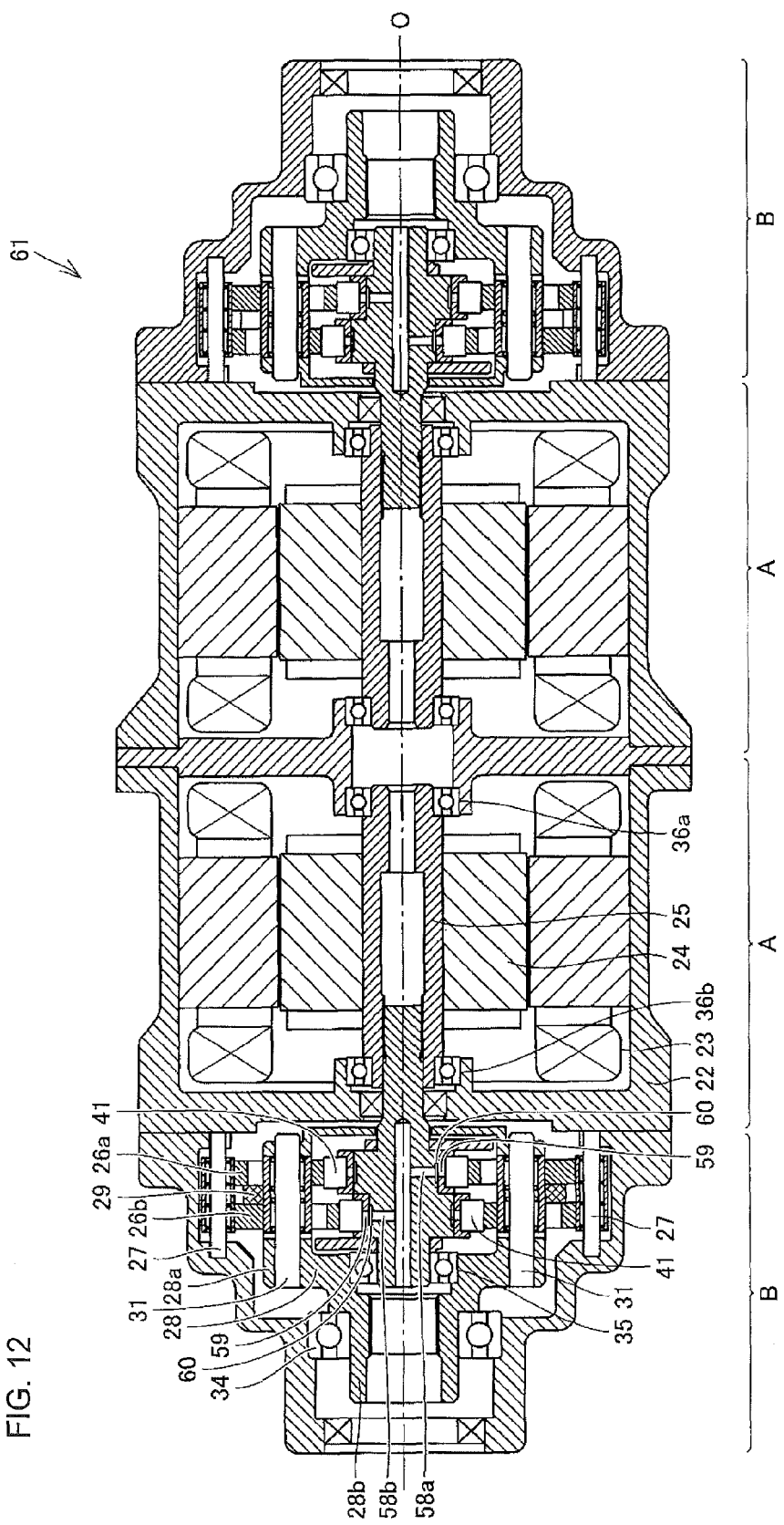
FIG. 12 is a vertical cross-sectional view showing the vehicle motor drive device in the same working example.

FIG. 11 is a plan view showing an arranged layout of a vehicle motor drive device 61 provided with the above speed reducer part B. In addition, FIG. 12 is a vertical cross-sectional view showing the vehicle motor drive device 61 in this working example. In this working example, the same references is assigned to the same component as that in the above working example and its description is omitted, and a different point will be described below.

The vehicle motor drive device 61 includes a speed reducer part B serving as the cycloidal speed reducer, and a motor part A to rotate and drive a motor-side rotation member 25 of the speed reducer part B, and it is mounted on the car body 11. The motor part A of the vehicle motor drive device 61 may have the same configuration as that of the motor part A of the in-wheel motor drive device 21, or may be a rotating electrical machine having a different configuration.

The speed reducer part B of the vehicle motor drive device 61 has the same basic configuration as that of the speed reducer part B of the in-wheel motor drive device 21, except for a configuration of a casing 22.

The vehicle motor drive device 61 has the two motor parts A and the two speed reducer parts B on the right and left sides. The two motor parts A are disposed back to back so as to be adjacent coaxially with the axis O. In addition, one speed reducer part B is arranged on the one side of the motor part A with respect to the axis O direction, and the other speed reducer part B is arranged on the other side of the motor art A with respect to the axis O direction.

A shaft part 28b of a wheel-side rotation member 28 positioned on the left side in a car width direction extends toward an end and its tip end is coupled to one end of a drive shaft 13L. The other end of the drive shaft 13L is coupled to the left wheel 12L. Similarly, the shaft part 28b of the wheel-side rotation member 28 positioned on the right side in the car width direction is coupled to the right wheel 12R through a drive shaft 13R.

According to the vehicle motor drive device 61, the left wheel 12L and the right wheel 12R can be independently driven, and a rolling fatigue life of the speed reducer part B increases, so that a long life can be implemented in the car body mount type of vehicle motor drive device. In addition, the left wheel 12L and the right wheel 12R may be either the front wheels or the rear wheels.

Figure 13:
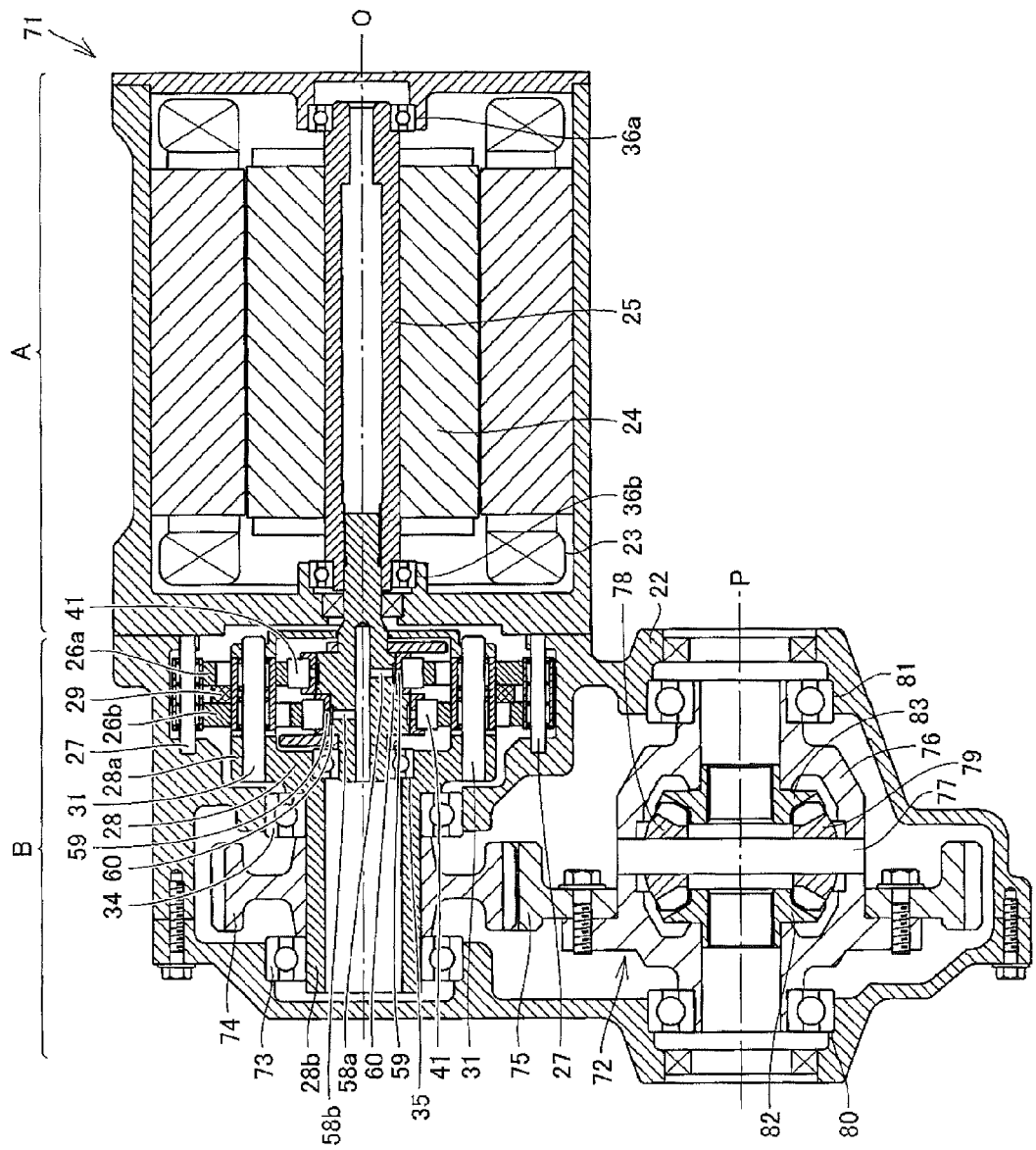
FIG. 13 is an exploded cross-sectional view showing a vehicle motor drive device in another working example.

Next, a description will be made of another working example of the vehicle motor drive device 61. FIG. 13 is an exploded cross-sectional view showing a vehicle motor drive device 71 according to another working example. In this working example, the same reference is assigned to the same component as that of the above embodiment and its description is omitted, and a difference point will be described below. According to this working example, one motor part A and one speed reducer part B serving as the cycloidal speed reducer are provided, and a differential gear device 72 is provided so as to mesh with a wheel-side rotation member 28 of the speed reducer part B.

The differential gear device 72 has a ring gear 75, a differential gear case 76, a pinion mate shaft 77, a pair of pinion mate gears 78 and 79, and two side gears 82 and 83, and a rotation of the wheel-side rotation member 28 is distributed to right and left wheels 12L and 12R.

A shaft part 28b of the wheel-side rotation member 28 extending along an axis O is rotatably supported on the side of a flange part 28a by a bearing 34 with respect to a casing 22, and rotatably supported on the side of its tip end by a bearing 73 with respect to the casing 22. Each of the bearing 34 and the bearing 73 is a rolling bearing. An outer circumference of the shaft part 28b is coupled to a center of a gear 74, between the bearing 34 and the bearing 73, and the gear 74 integrally rotates with the wheel-side rotation member 28.

The gear 74 meshes with the ring gear 75 of the differential gear device 72. The ring gear 75 is fixed on the external side of the differential gear case 76 which is rotatably supported by bearings 80 and 81 with respect to the casing 22. The pinion mate shaft 77 is provided inside the differential gear case 76 so as to penetrate it and intersect with a rotation shaft P, and the pair of pinion mate gears 78 and 79 is rotatably supported around the shaft 77 and provided in the differential gear case 76.

The pair of side gears 82 and 83 is provided between the pinion mate gears 78 and 79, and meshes with them and rotatably arranged in the differential gear case 76. The left side gear 82 is coupled to a left drive shaft 13L and integrally rotates with it. The right side gear 83 is coupled to a right drive shaft 13R and integrally rotates with it.

According to the vehicle motor drive device 71, the left wheel 12L and the right wheel 12R can be driven by the one motor part A and the one speed reducer part B, and a rolling fatigue life of the speed reducer part increases, so that a long life can be implemented in the car body mount type of vehicle motor drive device. In addition, the left ring 12L and the right wheel 12R may be either the front wheels or rear wheels.

While the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The present invention can be applied to a cycloidal speed reducer used in an in-wheel motor drive device.

EXPLANATION OF REFERENCES 21, 21L, 21R IN-WHEEL MOTOR DRIVE DEVICE, 22 CASING, 23 STATOR, 24 ROTOR, 25 MOTOR-SIDE ROTATION MEMBER (INPUT SHAFT), 25A, 25B ECCENTRIC MEMBER, 26A, 26B CURVE PLATE (REVOLUTION MEMBER), 27 OUTER PIN (OUTER CIRCUMFERENCE ENGAGEMENT MEMBER), 28 WHEEL-SIDE ROTATION MEMBER (OUTPUT SHAFT), 29 SUPPORT MEMBER (CENTER COLLAR), 30A, 30B THROUGH HOLE, 31 INNER PIN, 31A REINFORCEMENT MEMBER, 32 WHEEL HUB, 33 RECESSED PART, 34, 35, 36A, 36B, 41 ROLLING BEARING, 42 INNER RING MEMBER, 42A TRACK SURFACE, 42B FLANGE PART, 44 ROLLER (ROLLING BODY), 51 OIL POOL, 53 OIL PUMP, 55 COOLING OIL PATH, 58A, 58B LUBRICANT OIL PATH, 59 LUBRICANT OIL HOLE, 61, 71 VEHICLE MOTOR DRIVE DEVICE

The invention claimed is:

1. A cycloidal speed reducer comprising:
a casing;
an input shaft having one end arranged in said casing;
a disk-shaped eccentric member eccentric with respect to an axis of said input shaft and coupled to the one end of the input shaft;
a revolution member supported by said eccentric member, to make a revolution motion around said axis together with a rotation of said input shaft;
a rolling bearing arranged between an inner circumference of said revolution member and an outer circumference of said eccentric member, and a bearing internal gap of said roller bearing being larger than zero;
an outer circumference engagement member supported by said casing and engaging with an outer circumference part of said revolution member to cause the revolution member to make a rotation motion; and
an output shaft engaging with said revolution member to extract the rotation motion, wherein
said rolling bearing has a rolling body, an inner ring member mounted on the outer circumference of said eccentric member, and a lubricant oil hole penetrating from an inner diameter surface of the inner ring member to an outer circumference track surface thereof to supply a lubricant oil to the outer circumference track surface of the inner ring member being in rolling contact with said rolling body, and
said lubricant oil hole is arranged in a non-load range in which a bearing load is not applied from said output shaft and said outer circumference engagement member to said revolution member, in the outer circumference track surface of said rolling bearing, wherein
the inner ring member of the rolling bearing has:
  i) a non-load range which does not receive the bearing load and is larger than 180 degrees, and
  ii) a load range which receives the bearing load and is smaller than 180 degrees, and further wherein the input shaft has an axis oil path along its axis, the eccentric member has a lubricant oil path from the axis oil path toward the radial outer side of the eccentric member, and an annular groove is provided between the eccentric member and the inner ring member, the annular groove circumferentially extending and connecting the lubricant oil path and the lubricant oil hole.

2. The cycloidal speed reducer according to claim 1, wherein said lubricant oil hole is arranged in a range from 90 degrees to 270 degrees circumferentially away from a highest load portion receiving a highest bearing load to be shared, in said outer circumference track surface.

3. The cycloidal speed reducer according to claim 2, wherein said lubricant oil holes are arranged in at least a non-load portion at 180 degrees circumferentially away from said highest load portion receiving the highest bearing load to be shared, and angle portions at a predetermined angle away from said highest load portion at 180 degrees in one circumferential direction and in the other circumferential direction, in said outer circumference track surface, and said predetermined angle is 90 degrees or less.

4. The cycloidal speed reducer according to claim 1, wherein said lubricant oil hole is arranged in a region containing a closest portion closest to said axis as its center and ranging from one angle portion at 45 degrees therefrom in one circumferential direction to another angle portion at 45 degrees therefrom in the other circumferential direction, in said outer circumference track surface.

5. The cycloidal speed reducer according to claim 4, wherein said lubricant oil holes are arranged in at least the closest portion closest to said axis and angle portions at a predetermined angle from said closest portion closest to the axis in one circumferential direction and in the other circumferential direction, and said predetermined angle is 45 degrees or less.

6. The cycloidal speed reducer according to claim 1, wherein said rolling bearing is a cylindrical roller bearing comprising a flange part projecting from axial both ends of said outer circumference track surface toward the radial outer side.

7. An in-wheel motor drive device comprising the cycloidal speed reducer according to claim 1, a motor part to rotate and drive an input shaft of said cycloidal speed reducer, and a wheel hub fixedly connected to an output shaft of said cycloidal speed reducer.

8. A vehicle motor drive device comprising the cycloidal speed reducer according to claim 1, and a motor part to rotate and drive an input shaft of said cycloidal speed reducer, and mounted on a car body of a vehicle.

9. The vehicle motor drive device according to claim 8, comprising one said motor part and one said cycloidal speed reducer, and further comprising a differential gear device connected to an output shaft of said cycloidal speed reducer.

10. The vehicle motor drive device according to claim 8, comprising two said motor parts and two said cycloidal speed reducers, wherein two said motor parts are arranged so as to be coaxially adjacent back to back, and one said cycloidal speed reducers is arranged one axial side of said motor part, and the other said cycloidal speed reducers is arranged on the other axial side of said motor part.

* * * * *